United States Patent [19]

Petrick

[11] Patent Number: 4,916,284

[45] Date of Patent: Apr. 10, 1990

[54] METHOD OF MAKING HEMMED JOINTS UTILIZING LASER WELDING

[75] Inventor: Frederick D. Petrick, Warren, Mich.

[73] Assignee: General Motors Corporation, Detroit, Mich.

[21] Appl. No.: 348,749

[22] Filed: May 8, 1989

[51] Int. Cl.$^4$ .............................................. B23K 26/00
[52] U.S. Cl. .......................... 219/121.64; 219/121.85
[58] Field of Search ...................... 219/121.63, 121.64, 219/121.13, 121.14, 121.45, 121.46, 121.6, 121.85

[56] References Cited

U.S. PATENT DOCUMENTS

| | | | |
|---|---|---|---|
| 4,386,728 | 6/1983 | Torok et al. ......................... | 228/111 |
| 4,682,002 | 7/1987 | Delle Piane et al. ........... | 219/121.64 |
| 4,684,775 | 8/1987 | Berlinger et al. ............... | 219/121.64 |
| 4,719,689 | 1/1988 | Yamamoto et al. .................. | 29/458 |

FOREIGN PATENT DOCUMENTS

| | | | |
|---|---|---|---|
| 0157913 | 10/1985 | European Pat. Off. ....... | 219/121.64 |
| 2600923 | 1/1988 | France ............................. | 219/121.64 |
| 0027189 | 2/1986 | Japan .............................. | 219/121.64 |

*Primary Examiner*—C. L. Albritton
*Attorney, Agent, or Firm*—C. R. Meland

[57] ABSTRACT

Methods of laser welding zinc coated galvalized steel are disclosed. In a method that relates to forming hem joints for motor vehicle body components a sheet of steel is provided with a plurality of V-shaped tabs. When a hem joint is formed the V-shaped tabs together with a surface of another sheet of steel form gas venting channels that provide an escape passage for gas vapors that are developed when the zinc coating is vaporized by laser welding. In another method of laser welding, one of the steel sheets has an axially extending wall that is V-shaped to provide a V-shaped groove and the wall has spaced gas vent holes.

9 Claims, 2 Drawing Sheets

METHOD OF MAKING HEMMED JOINTS UTILIZING LASER WELDING

This invention relates to a method of making a hemmed joint between galvanized steel panels that form a part of a motor vehicle body such as an door and more particularly to such a method that utilizes laser welding.

It is common practice in the manufacture of motor vehicle body parts, such as doors, to provide a hem joint between inner and outer steel panels where a quantity of adhesive material such as an epoxy resin is deposited between inner surfaces of the hem and outer surfaces of the inner panel. The adhesive serves as a corrosion preventive sealer and also when cured secures the panels together.

Various types of adhesives can be used and the cost of the adhesive generally depends on its cure time. A fast curing adhesive (induction cure epoxy) is generally more expensive than a slow curing adhesive (thermo cure epoxy) and requires induction heating apparatus to fast cure the adhesive. It accordingly would be desirable to utilize a slow curing adhesive.

The use of a slowly curing adhesive poses certain problems. Thus, prior to curing, the inner and other panels may shift relative to each other and the uncured adhesive does not provide sufficient structural integrity for door hanging. Structural integrity can be provided and panel shifting prevented by making a few spot welds between the panels but this procedure may require metal finishing (sanding) of the ends of the spot welds so that they will not be visible at the surface of the outer panel.

It is an object of this invention to provide a new and improved method of manufacturing hem joints that utilize laser welding of inner and outer metal panels where the weld is made such that it does not penetrate to the outer surface of the outer panel thereby eliminating the need for any metal finishing of the outer surface of the outer panel. In accordance with the method of this invention, the steel panels are galvanized and the hem is arranged to permit gases generated during the laser welding to escape. This prevents the gas from causing weld porosity.

In regard to providing an escape path for gas generated during laser welding, the hem flange of the outer panel is provided with a plurality of integral generally v-shaped tabs that are laser welded to the inner panel. These tabs provide a channel for the escape of gas during the laser welding thus assuring that the welds will not be porous.

In accordance with another aspect of this invention, galvanized steel panels are laser welded by an arrangement wherein one panel has a v-shaped portion that is provided with a plurality of spaced vent openings that allow escape of gas during laser welding.

IN THE DRAWINGS

Figure 1:
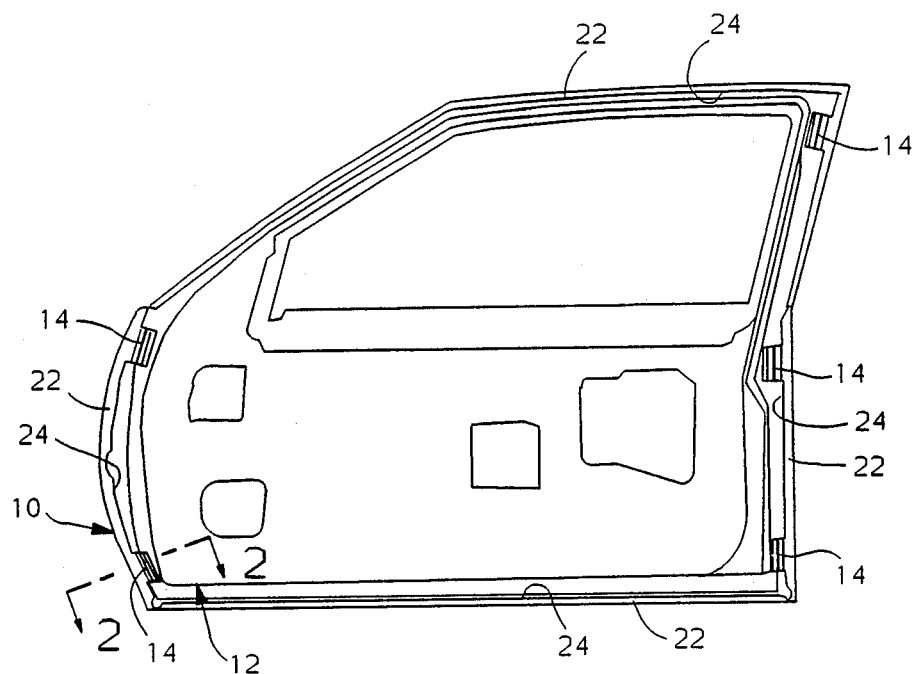
FIG. 1 is a plan view of a motor vehicle door looking at the inside of the door.

Referring now to the drawings, FIG. 1 illustrates a door for an automobile that is manufactured by the method of this invention. The door is comprised of an outer panel 10 and an inner panel 12. Both panels are formed of galvanized low carbon steel and the panels may have a thickness of about 1/16 to ⅛ inches. Panel 10 is comprised of a sheet of steel 10A which is coated with zinc material on both sides to form thin zinc layers 10B and 10C. In a similar fashion, panel 12 is comprised of a sheet of steel 12A which is coated on both sides with zinc material to form thin zinc layers 12B and 12C.

Figure 2:
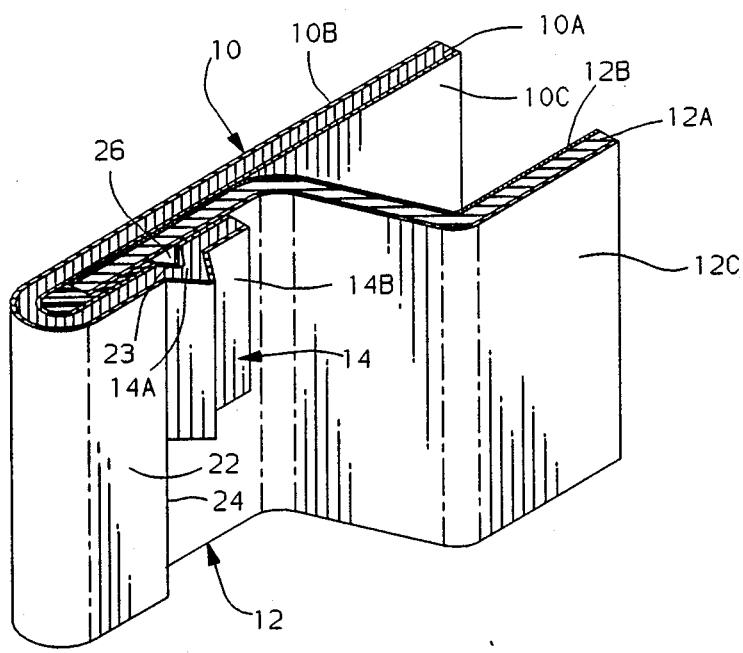
FIG. 2 is a sectional view in perspective taken along line 2—2 of FIG. 1.
Figure 3:
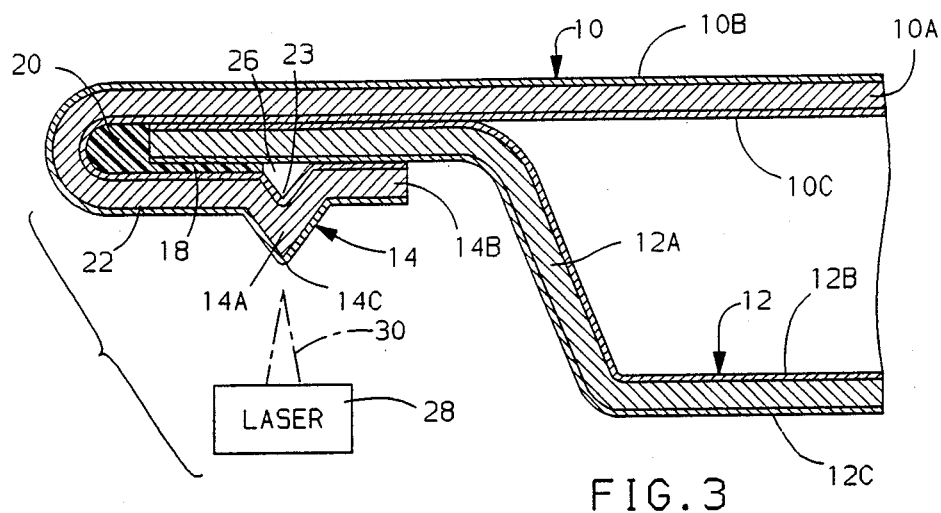
FIG. 3 is a sectional view similar to FIG. 2 illustrating laser welding apparatus for welding parts of the door.

The panel outer 10, prior to hemming, is a flat sheet of material and is configured or formed to have five spaced tabs, each designated as 14. These tabs are initially flat and are coined or embossed to provide a v-shaped portion 14A joined to a flat portion 14B as illustrated in FIGS. 2 and 3. The purpose of the tabs 14 will be described hereinafter.

The outer panel 10 is joined to a marginal portion of inner panel 12 by a hemming machine which folds a portion of panel 10 about a marginal portion of inner panel 12. Prior to this folding or hemming operation, beads of adhesive material are placed on a marginal surface of panel 12 and after the folding or hemming operation, the adhesive material is forced to spread into and fill certain areas between the hem joint of the inner and outer panels. After hemming is completed the adhesive is forced or squeezed to the shape shown in FIGS. 2 and 3 where the adhesive is shown as having a portion 18 between the panels and the portion 20 in the space between an end of panel 12 and an arcuate inner surface of the marginal portion of panel 10. The portions 18 and 20 extend entirely around the outer periphery of the door to provide a continuous corrosion preventive seal.

After the adhesive has been applied and the hemming or folding operation is completed, the parts of the inner and outer panels have the configuration shown in FIGS. 2 and 3. Thus, a hem flange 22 having a hem line 24 has been formed. The tabs 14 are folded around inner panel 12 during the hemming operation and extend inwardly of the hem flange 22.

The tabs 14 may have a length of about ¾ to 1½ inches. It can be seen in FIGS. 2 and 3 that the V-shaped portion 14A forms a V-shaped groove 23 which may have a depth of about 0.005 to 0.012 inches. When portion 14B engages panel 12 a triangular shaped channel or passage 26 is formed that is open to the atmosphere at both ends of a tab 14. The V-shaped portion 14A ca be dimensioned such that the base of the triangular shaped channel 26 is about ⅜ to ½ inches wide. The height of the triangular channel 26 from apex to a surface of panel 12 will be about 0.005 to 0.012 inches where groove 23 has the dimensions described.

After the adhesive has been applied and the hemming operation has been completed, the tabs 14 are laser welded to the steel sheet 12A in a manner illustrated in FIG. 3. In FIG. 3 the reference numeral 28 designates laser welding apparatus which generates a laser beam 30. This laser welding apparatus includes conventional laser beam generating and focusing apparatus which is not illustrated. The maximum power of the laser welder may be about 3 KW.

With the parts in the position shown in FIG. 3, the laser beam is directed at point 14C of tab 14. The flat portion 14B of tab 14 is held against panel 12 by a suitable clamping apparatus which is not illustrated. The laser apparatus and the door are now moved relative to each other so that the entire length of tab 14 is laser welded to the sheet 12A along a line that coincides with point 14C.

Figure 4:
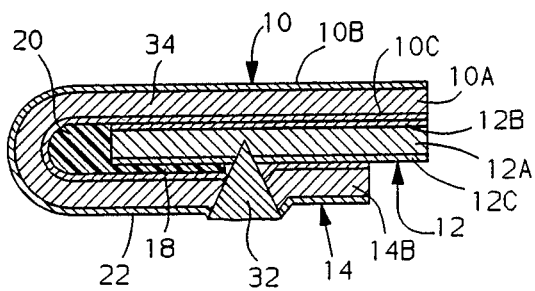
FIG. 4 is a sectional view similar to FIG. 3 but illustrating the door panels after laser welding.

The weld nugget or weld zone that is formed by the laser welding operation is shown in FIG. 4 and designated as 32. It can be seen that the weld 32 has joined steel sheets 10A and 12A. However, the weld 32 does not penetrate through to area 34 of sheet 10A and accordingly there will be no weld nugget marks on the outside of steel sheet 10A with the result that no metal finishing, such as sanding, is required. This is in contrast to using spot welding to weld sheets 10A and 12A which requires metal finishing of the ends of the spot welds. Further, it can be seen from a comparison of FIGS. 3 and 4 that V-shaped portion 14A has been melted down into what was previously channel 26 to form a portion of nugget or zone 32.

In FIG. 4 the weld zone 32 extends only between steel sheets 10A and 12A. The weld zone 32 could, by suitable focusing of the laser beam, be made to penetrate into area 34 of sheet 10A is long as no weld mark or nugget is formed at the exterior surface of panel 10 adjacent area 34.

During the laser welding of tabs 14 to steel sheet 12A, the steel material is heated to melt portions of steel sheets 10A and 12A to form weld 32. Further, during laser welding, portions of the zinc coatings that are subjected to the laser beam vaporize to form zinc vapors or gas. The gas escapes to the atmosphere through channel or passage 26 so that non-porous welds are produced. The channel 26 is open to the atmosphere at the opposite ends of a tab 14.

The final weld nugget 32 that is produced will have a length equal to the length of a tab 14. Thus, if a tab 14 is ¾ inches long the weld zone or nugget 32 will be ¾ inches long. As has been described, the door has five tabs 14 and each tab is laser welded in a manner that has been described. The tabs 14 are strategically located in areas that accommodate the configuration of inner panel 12.

Figure 6:
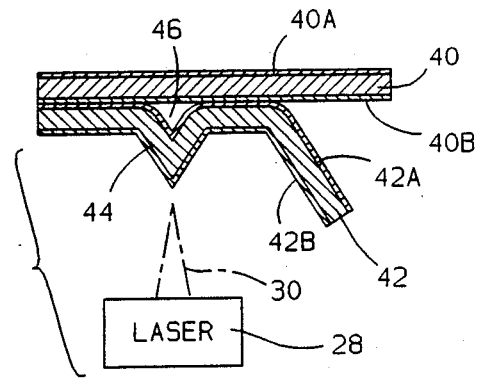
FIG. 6 is a sectional view taken along line 6—6 of FIG. 5 which also illustrates the position of laser welding apparatus.
Figure 5:
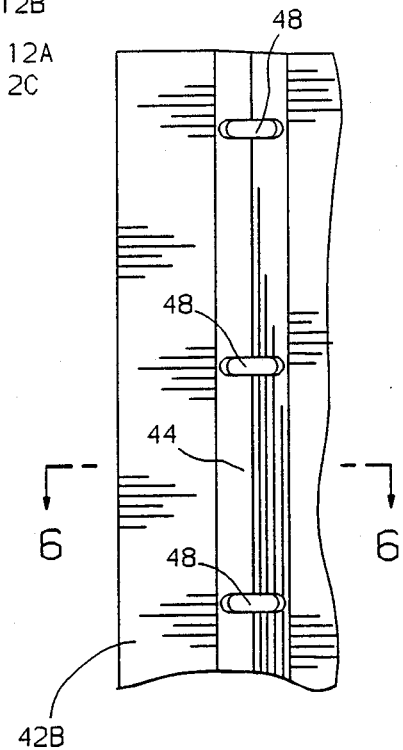
FIG. 5 is a plan view illustrating the configuration of steel panels where one panel has vent holes for venting gases generated during laser welding.

FIGS. 5 and 6 illustrate a modified method of laser welding two galvanized steel sheets. The first steel sheet is designated as 40 and it has thin zinc coatings 40A and 40B. The second steel sheet is designated as 42 and it has thin zinc coatings 42A and 42B. Sheet 42 has a V-shaped portion 44 and it together with a surface of coating 40B form a triangular channel or passage 46. The channel 46 communicates with a plurality of spaced vent passages or openings 48 that extend through v-shaped portion 44.

In the method shown in FIGS. 5 and 6, laser welder 28 melts the material of V-shaped portion 44 and a portion of sheet 40 to create a weld that has the same shape as the weld 32 shown in FIG. 4. The gas vapor that is developed as the zinc coating vaporizes can escape to the atmosphere through a plurality of paths. One path is axially through channel 46 and other escape paths are through vent openings or holes 48. In the embodiment of FIGS. 5 and 6 the lengths of V-shaped portions 44 between the vent holes 48 are welded to steel sheet 40. This is accomplished by moving the welder 28 relative to the two steel sheets and turning off the welder when the welder is aligned with a hole 48 so that no melting of the steel sheet 40 occurs over areas aligned with vent holes 48.

In regard to the use of an adhesive, as explained in connection with FIGS. 1-4, the adhesive that is used can be thermo-cure epoxy composition which is slow curing but less expensive than a fast curing induction cure epoxy material. The cost savings in material may be as much as 50%. The slow thermo-cure epoxy material can be used because, as explained, the metal sheets are laser welded together to prevent the sheets from shifting relative to each other as the welded panels move through an assembly plant. The laser welding method that has been described does not produce any sort of welding mark or nugget that would otherwise need to be finished off. The thermo-cure epoxy is eventually fully cured after the door is painted and during a paint bake process.

In summary, the method of joining metal panels or sheets in accordance with this invention has the following advantages:

1. The need for expensive induction cure type epoxy material is eliminated.

2. Induction heating curing stations that are needed for fast curing epoxy (induction cure type) are eliminated.

3. The need for spot weld metal finishing is eliminated.

In regard to induction heating apparatus for induction cure epoxy, it is possible that the high induction heat application will start stress relief in the metal panels or sheets to change the shape of the final product such as a door. This is another reason for avoiding the use of induction cure epoxy.

It is noted that laser welding leaves a gun blueing effect on the metal which is anti-corrosive to some degree. Gun blueing in itself is a form of inactive rust.

The methods of this invention can be used for the manufacture of doors as has been described and can be used in connection with the manufacture of other motor vehicle body components such as, but not limited to, hoods and trunk lids.

The gas vent grooves like groove 23 have been described as being V-shaped. It will be appreciated that shapes other than a V-shape could be used. By way of example the groove could be an arcuate shape instead of a v-shape.

The embodiments of the invention in which an exclusive property or privilege is claimed are defined as follows:

1. A method of making a hem joint between two sheets of steel that have a corrosion protective metallic zinc coating, the steps comprising, forming a first sheet of steel into a configuration that has a hem flange portion which carries a plurality of spaced tab portions that extend from said flange portion, forming each tab portion to define a groove, folding said hem flange portion and said tabs around a marginal portion of a second sheet of steel to form a hem joint, said hem joint being defined by said hem flange portion and a portion of said first sheet with said marginal portion of said second sheet disposed therebetween, the wall of said tab that defines said groove and a portion of said second steel sheet said that faces said wall defining a gas vent channel which is open to the atmosphere at opposite ends of a tab portion, and then directing a laser beam sequentially to each tab portion at a point aligned with a said channel to create a weld zone of molten metal that connects a tab portion to a portion of said second sheet, said channel providing a path for the escape of gas developed by the vaporizing of said zinc coating.

2. The method according to claim 1 where said groove is V-shaped.

3. The method according to claim 1 where said groove has a maximum depth of 0.005 to 0.012 inches.

4. The method according to claim 1 where an adhesive is applied to a surface of said marginal portion of said second sheet prior to said folding of said hem flange, said adhesive after folding providing a sealed hem joint, said tabs being disposed inside of said adhesive.

5. The method according to claim 1 where both sides of said first and second steel sheets are coated with a thin layer of zinc.

6. The method according to claim 1 where the length of said weld zone is such that no weld imperfection is formed on an exterior surface of said first portion of said sheet.

7. The method according to claim 1 where no portion of said weld zone penetrates into said portion of said first sheet.

8. The method of laser welding two sheets of steel that have a corrosion protective metallic zinc coating, the steps comprising, forming a first sheet of steel into a configuration that has a wall defining an axially extending groove, said wall having a plurality of spaced holes extending therethrough defining gas vents, placing said first, sheet of steel against a flat portion of a second sheet of steel whereby a portion of said flat portion that faces said groove and said wall define an axially extending channel that is open at its ends and is open to said spaced holes, and then directing a laser beam to lengths of said wall disposed between said holes to thereby laser weld said lengths to said second sheet of steel, said channel and holes operative to provide paths for the escape of gases developed by vaporization of said zinc coating during laser welding.

9. The method according to claim 8 where the groove is v-shaped.

* * * * *